United States Patent
Roberts et al.

(10) Patent No.: US 8,468,357 B2
(45) Date of Patent: Jun. 18, 2013

(54) MULTIPLE STEP IDENTIFICATION OF RECORDINGS

(75) Inventors: Dale T. Roberts, San Anselmo, CA (US); David C. Hyman, Kensington, CA (US); Stephen Helling White, San Franciso, CA (US)

(73) Assignee: Gracenote, Inc., Emeryville, CA (US)

( * ) Notice: Subject to any disclaimer, the term of this patent is extended or adjusted under 35 U.S.C. 154(b) by 650 days.

(21) Appl. No.: 12/720,537

(22) Filed: Mar. 9, 2010

(65) Prior Publication Data

US 2010/0158488 A1 Jun. 24, 2010

Related U.S. Application Data

(62) Division of application No. 10/208,189, filed on Jul. 31, 2002.

(60) Provisional application No. 60/308,594, filed on Jul. 31, 2001.

(51) Int. Cl.
G06F 7/04 (2006.01)

(52) U.S. Cl.
USPC .......................................... 713/176

(58) Field of Classification Search
USPC .......................................... 713/176
See application file for complete search history.

(56) References Cited

U.S. PATENT DOCUMENTS

| | | | |
|---|---|---|---|
| 4,843,562 A | 6/1989 | Kenyon et al. | |
| 5,751,672 A | 5/1998 | Yankowski | |
| 5,884,298 A | 3/1999 | Smith, II et al. | |
| 5,918,223 A | 6/1999 | Blum et al. | |
| 6,304,523 B1 | 10/2001 | Jones et al. | |
| 6,345,256 B1 | 2/2002 | Milsted et al. | |
| 6,400,996 B1 | 6/2002 | Hoffberg et al. | |
| 6,453,252 B1 | 9/2002 | Laroche | |
| 6,505,160 B1 | 1/2003 | Levy et al. | |
| 6,829,368 B2 | 12/2004 | Meyer et al. | |

(Continued)

FOREIGN PATENT DOCUMENTS

| EP | 0319567 B1 | 2/1993 |
|---|---|---|
| EP | 1197020 B1 | 11/2007 |

(Continued)

OTHER PUBLICATIONS

"U.S. Appl. No. 10/208,189 response filed Feb. 9, 2009 to Non-Final Office Action mailed Feb. 3, 2009", 8 pgs.

(Continued)

*Primary Examiner* — Tamara T Kyle
(74) *Attorney, Agent, or Firm* — Schwegman Lundberg & Woessner, P.A.

(57) ABSTRACT

Multiple information is extracted from an unknown recording and information associated therewith. Associated information includes the filename, if the recording is a computer file in, e.g., MP3 format, or table of contents (TOC) data, if the recording is on a removable medium, such as a compact disc. At least one and preferably several algorithmically determined fingerprints are extracted from the recording using one or more fingerprint extraction methods. The information extracted is compared with corresponding information in a database maintained for reference recordings. Identification starts with the most accurate and efficient method available, e.g., using a hash ID, a unique ID or text. Fingerprint matching is used to confirm other matches and validation is performed by comparing the duration of the unknown and a possibly matching reference recording.

34 Claims, 6 Drawing Sheets

U.S. PATENT DOCUMENTS

| | | | |
|---|---|---|---|
| 6,931,451 | B1 | 8/2005 | Logan et al. |
| 6,941,275 | B1 | 9/2005 | Swierczek |
| 6,990,453 | B2 | 1/2006 | Wang et al. |
| 7,174,293 | B2 | 2/2007 | Kenyon et al. |
| 7,194,752 | B1 | 3/2007 | Kenyon et al. |
| 7,302,574 | B2 | 11/2007 | Conwell et al. |
| 7,328,153 | B2 | 2/2008 | Wells et al. |
| 7,349,552 | B2 | 3/2008 | Levy et al. |
| 7,415,129 | B2 | 8/2008 | Rhoads |
| 7,461,136 | B2 | 12/2008 | Rhoads |
| 7,548,851 | B1 | 6/2009 | Lau et al. |
| 7,587,602 | B2 | 9/2009 | Rhoads |
| 7,590,259 | B2 | 9/2009 | Levy et al. |
| 2002/0052885 | A1* | 5/2002 | Levy ............... 707/200 |
| 2002/0083060 | A1 | 6/2002 | Wang et al. |
| 2002/0133499 | A1 | 9/2002 | Ward |
| 2003/0028796 | A1 | 2/2003 | Roberts et al. |
| 2003/0037010 | A1 | 2/2003 | Schmelzer |
| 2003/0061490 | A1 | 3/2003 | Abajian |
| 2003/0105739 | A1 | 6/2003 | Essafi et al. |
| 2004/0034650 | A1 | 2/2004 | Springer et al. |
| 2008/0052783 | A1* | 2/2008 | Levy ............... 726/26 |
| 2009/0158318 | A1* | 6/2009 | Levy ............... 725/32 |
| 2010/0161656 | A1 | 6/2010 | Roberts et al. |
| 2010/0281545 | A1* | 11/2010 | Levy ............... 726/30 |

FOREIGN PATENT DOCUMENTS

| | | |
|---|---|---|
| WO | WO-9825269 A1 | 6/1998 |
| WO | WO-0128222 A2 | 4/2001 |
| WO | WO-03012695 A2 | 2/2003 |
| WO | WO-03012695 A3 | 2/2003 |

OTHER PUBLICATIONS

"U.S. Appl. No. 10/208,189, Final Office Action mailed Oct. 30, 2006", 20 pgs.

"U.S. Appl. No. 10/208,189, Non-Final Office Action mailed Mar. 27, 2006", 17 pgs.

"U.S. Appl. No. 10/208,189, Response filed Apr. 30, 2007 to Final Office Action mailed Oct. 30, 2006", 16 pgs.

"U.S. Appl. No. 10/208,189, Response filed Jul. 27, 2006 to Non-Final Office Action mailed Mar. 27, 2006", 22 pgs.

"U.S. Appl. No. 10/208,189, Response to Final Office Action mailed Oct. 30, 2006", 14.

"U.S. Appl. No. 10/208,189, Final Office Action mailed Apr. 28, 2009", 19 pgs.

"U.S. Appl. No. 10/208,189, Non-Final Office Action mailed Oct. 16, 2009", 23 Pgs.

"U.S. Appl. No. 10/208,189, Response filed Jan. 15, 2010 to Non Final Office Action mailed Oct. 16, 2009", 14 pgs.

"U.S. Appl. No. 10/208.189, Response filed Jul. 28, 2009 to Final Office Action mailed Apr. 28, 2009", 16 pgs.

"European Application Serial No. 02763377.5, Office Action mailed Jan. 17, 2007", 6 pgs.

"European Application Serial No. 02763377.5, Office Action mailed Sep. 10, 2004", 9 pgs.

"Japan application No. 2003-517800 Notice of allowance mailed Oct. 6, 2009".

"Japanese Application Serial No. 2003-517800, Office Action Apr. 22, 2008", 6 pgs.

"Japanese Application Serial No. 2003-517800, Office Action mailed Oct. 24, 2008", 6 pgs.

"Korean Application Serial No. 10-2004-7001538, Office Action mailed May 18, 2009", 13 pgs.

"Korean Application Serial No. 2004-7001538, Office Action mailed Oct. 8, 2008", 11 pgs.

"Korean Application Serial No. 2004-7001538, Office Action Mailed Nov. 18, 2009", 3.

"The MusicBrainz Mailing List Archive for Nov. 2000", [Online]. Retrieved from the Internet: <URL:http://www.musicbrainz.org/pipermail/musicbrainz/2000-November.txt.gz>, 30 pgs.

"U.S. Appl. No. 10/208,189 Final Office Action mailed Jul. 26, 2010", 81 pgs.

"U.S. Appl. No. 12/720,550, Response filed Jan. 11, 2012 to Non Final Office Action mailed Oct. 18, 2011", 15 pgs.

"U.S. Appl. No. 12/720,550, Response filed May 1, 2012 to Final Office Action mailed Mar. 16, 2012", 14 pgs.

"U.S. Appl. No. 12/720,550, Advisory Action mailed May 10, 2012", 3 pgs.

"U.S. Appl. No. 12/720,550, Examiner Interview Summary mailed Aug. 23, 2012", 3 pgs.

"U.S. Appl. No. 12/720,550, Final Office Action mailed Mar. 16, 2012", 24 pgs.

"U.S. Appl. No. 12/720,550, Non Final Office Action mailed Oct. 18, 2011", 20 pgs.

"European Application Serial No. 02763377.5, Office Action mailed Sep. 16, 2010", 7 Pgs.

"European Application Serial No. 02763377.5, Office Action Response filed", 18 pgs.

"Korean Application Serial No. 10-2004-7001538, Notice of Allowance mailed Apr. 14, 2010", 2 pgs.

Redd, Justin, "Calculating statistical confidence levels for error-probability", Lightwave Magazine, http://www.lightwaveonline.com/about-us/lightwave-issue-archives/issue/calculating-statistical-confidence-levels-for-error-probability-estimates-53462167.html, accessed Aug. 11, 2010, (Mar. 31, 2000), 6 pgs.

Wang, Avery Li-Chuan, "An Industrial-Strength Audio Search Algorithm", Proceedings of the Fourth International Conference on Music Information Retrieval (Baltimore), www.ismir.net, (Oct. 26-30, 2003), 7 pgs.

Wang, Avery Li-Chuan, "Shazam Entertainment", ISMIR 2003, http://ismir2003.ismir.net/presentations/Wang.pdf, (Oct. 29, 2003), 39 pgs.

* cited by examiner

MULTIPLE STEP IDENTIFICATION OF RECORDINGS

CROSS-REFERENCE TO RELATED APPLICATION(S)

This application is a Divisional of U.S. application Ser. No. 10/208,189, filed on Jul. 31, 2002, which claims priority to U.S. Provisional Application No. 60/308,594, filed Jul. 31, 2001, and which applications are incorporated by reference herein in their entirety.

BACKGROUND OF THE INVENTION

1. Field of the Invention

The present invention is directed to recognition of recordings from their content, and, more particularly to combining fingerprint recognition with other information about a recording to increase reliability of recognition and to accomplish reliable recognition efficiently by using the least expensive forms of recognition first and layering on more complex forms as needed.

2. Description of the Related Art

There are many uses for recognition of audio (and video) recordings. Many of the uses relate to compensation or control by the rights holders for reproduction and performance of the works recorded. This use of such systems has increased in importance since the development of file sharing software, such as Napster, and the many other similar services available at the end of the twentieth century and the beginning of the twenty first century. Although the need for accurate recognition has been significant for several years, no system has been successful in meeting this need.

Another use of recording recognition is to provide added value to users when listening (or watching) recordings. One example is the CDDB Music Recognition Service from Gracenote, Inc. of Berkeley, Calif. which recognizes compact discs (CDs) and supplies information regarding a recognized CD, such as album name, artist, track names and access to related content on the Internet, including album covers, artist and fan websites, etc. While the CDDB service is effective for recognizing compact discs, there are several draw backs in using it to recognize files that are not stored on a removable disc, such as CD or DVD.

All audio fingerprinting techniques have "blind spots", places where a system using that technique sees similarities and differences in audio where it shouldn't. By relying on just one fingerprinting technique, single source solutions are less accurate when encountering a 'blind spot'.

One of the more popular uses for the Gracenote CDDB system is in applications that digitally encode audio files into MP3 and other formats. These encoding applications utilize Gracenote's CDDB service to recognize the compact disc being encoded and to write the correct metadata into the title and ID tags. Gracenote's CDDB service returns a unique ID (TUID) for each track and supports the insertion of such IDs in the ID3V2 tags for MP3 files. The TUID is both hashed and proprietary, and can only be read by the Gracenote system. However, the ID3V2 tags can easily be manipulated to store a TUID for one file in the ID3V2 tag for another file and therefore, the TUID alone is not a reliable identifier of the audio content in a file.

Gracenote's CDDB service also provides text matching capability that can be utilized to identify digital audio files from their file names, file paths, ID tags (titles), etc. by matching the text extracted by a client device to a metadata database of track, artist, and album names. Although this text matching utilizes user-generated spelling variants associated with each record to improve recognition, there has been no way to verify that the text matches the audio content of the recording once the recording has been separated from a compact disc and stored in a file in any format.

SUMMARY OF THE INVENTION

An aspect of the present invention is maximizing identification of recordings while minimizing resource usage.

Another aspect of the present invention is using multiple identification methods so that resource intensive methods, such as audio fingerprinting, are employed only when necessary.

A further aspect of the invention is minimization of processing of unidentified data.

Yet another aspect of the present invention is to use the least expensive recognition technique, with progressively more expensive recognition techniques layered onto the process until a desired confidence level is reached.

A still further aspect of the invention is validation of content-based identification of a recording by comparing text associated with an unidentified recording and text associated with identification records.

Yet another aspect of the present invention is use of recording identification methods from different sources to increase reliability.

A still further aspect of the invention is validation of content-based recording identification using fuzzy track length analysis.

Yet another aspect of the invention is automatic extraction of identification data for use in a reference database and for identification of recordings.

A still further aspect of the invention is that unidentified recordings are periodically re-run through the system to determine if recently added data or recently improved techniques will result in recognition.

The above aspects can be attained by a method of identifying recordings by extracting information about an unknown recording stored in media possessed by a user and at least one algorithmically determined fingerprint from at least one portion of the unknown recording; determining a possible identification of the unknown recording using at least one piece of the information extracted from the unknown recording and an identification database of corresponding information for reference recordings; and identifying the unknown recording when the possible identification based on each of the at least one piece of the information in combination with the at least one algorithmically determined fingerprint identifies a single reference recording with respective confidence levels. The at least one portion of the unknown recording may contain audio, video or both.

Preferably, the database is maintained by a provider of identification services which supplies unique identifiers that can be recognized only by servers under the control of the provider of identification services. The unique identifiers are associated with recordings once they have been identified. Subsequently, copies of the recordings are recognized using the unique identifiers to greatly speed up the process. The unique identifiers optionally are cached in high-speed RAM or specially indexed database tables.

When non-waveform data is not available for an unknown recording, the unknown recording is preferably identified by extracting fingerprints from at least one portion of the unknown recording using a plurality of algorithms; determining a possible identification of the unknown recording using at least two of the fingerprints extracted from the unknown recording and at least one database of correspondingly generated fingerprints for reference recordings; and identifying the unknown recording when the possible identification based on each of the fingerprints identifies a single reference recording with respective confidence levels.

Preferably, an existing database, used to identify recordings possessed by users, which does not contain fingerprint information is expanded by obtaining non-waveform data associated with a recording possessed by a user of the database; extracting at least one fingerprint from at least one portion of the recording; and storing the at least one fingerprint as identifying information for the recording, when a match is found in the database for the non-waveform data. One example is that during the process of encoding digital music files from an audio CD possessed by a user, a recognition system can be used to identify the audio CD so that fingerprints extracted during the encoding process can be directly associated with the audio CD using a unique ID system.

Recognition of recordings using either fingerprints or unique identifiers is preferably validated by other information maintained in the identification database, such as the length of the recording or a numeric identifier embedded within the recording. Information about recordings that do not pass validation or match some, but not all of the information used for identification, may be stored for later analysis of the reason for the error. If the fingerprints are obtained as described above, there may have been an error in obtaining the fingerprint. Therefore, errors may be output to an operator, or the system could correct the information stored in the database, based on recognition of patterns in the information that is stored for improper matches. For example, if a large percentage of matching fingerprints are stored, but the other information consistently does not match them, there could be an error in the fingerprint database which needs to be flagged to an operator.

The present invention includes a system for identifying recordings that includes an extraction unit to extract information about an unknown recording stored in media possessed by a user and at least one algorithmically determined fingerprint from at least one portion of the unknown recording; and an identification unit, coupled to the extraction unit, to make a possible identification of the unknown recording using at least one piece of the information extracted from the unknown recording and an identification database of corresponding information for reference recordings, and to identify the unknown recording when the possible identification based on each of the at least one piece of the information in combination with the at least one algorithmically determined fingerprint identifies a single reference recording with respective confidence levels.

The present invention also includes a system for identifying recordings that includes an extraction unit to extract fingerprints from at least one portion of an unknown recording using a plurality of algorithms, and an identification unit, coupled to said extraction unit, to make a possible identification of the unknown recording using at least two of the fingerprints extracted from the unknown recording and at least one database of correspondingly generated fingerprints for reference recordings, and to identify the unknown recording when the possible identification based on each of the fingerprints identifies a single reference recording with respective confidence levels.

In either of the systems described above, the extraction unit is typically a client unit connected by a network, such as the Internet, to at least one server as the identification unit. The client device may be a personal computer with a drive accessing the recording, a consumer electronics device with a network connection, or a server computer transmitting the unknown recording from one location to another. Furthermore, a portion of the database may be available locally and the extraction unit and identification unit may reside in the same device and share components.

The present invention also includes a system for obtaining reference information stored in a database used to identify unknown recordings, including a receiving unit to obtain non-waveform data associated with a recording possessed by a user of the database for identification of recordings possessed by the user; an extraction unit to extract at least one fingerprint from at least one portion of the recording; and a storage unit, coupled to said receiving unit and said extraction unit, to store the at least one fingerprint as identifying information for the recording, when a match is found in the database for the non-waveform data.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
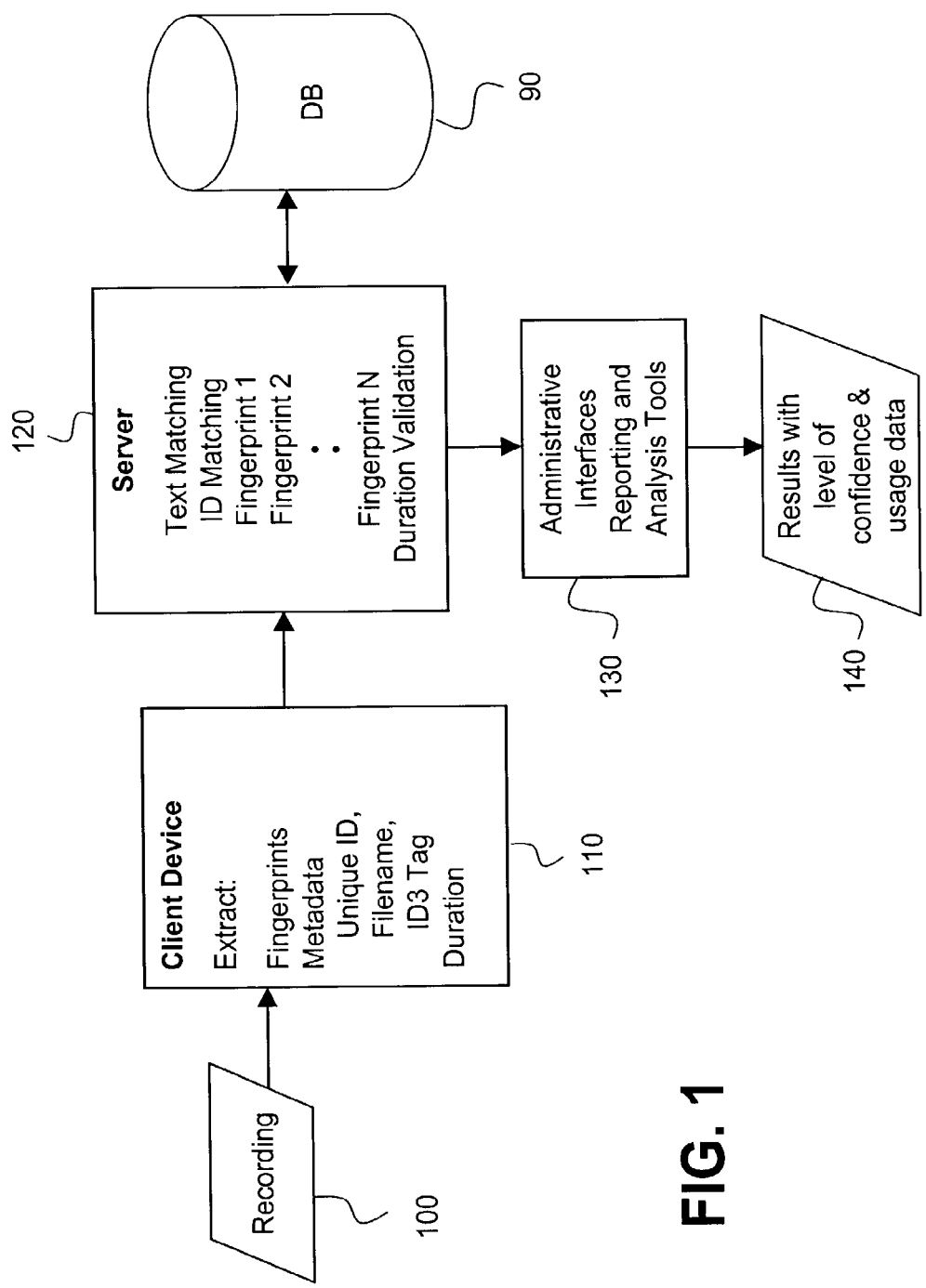
FIG. 1 is a functional block diagram of a system according to the present invention.

According to the present invention, a suite of identification components are provided in a system like that illustrated in FIG. 1 to facilitate analysis and identification of audio (and video) files utilizing multiple methods. Preferably, an existing database 90 containing recording identifiers and text data is combined with text-based digital audio and audio fingerprinting identification methods. Preferably, the text data in database 90 is obtained from user submissions and includes user-submitted spelling variants. One such database is available as the CDDB Music Recognition Service from Gracenote, Inc.

As illustrated in FIG. 1, a recording 100 is accessed by client device 110 via any conventional method, such as reading a digital audio file from a hard drive or a compact disc. Information is extracted from recording 100 and associated information (metadata). Fingerprints are extracted from recording 100, as described in more detail below. The information that is extracted from the metadata includes the duration of the recording which is the track length (from the TOC) for a CD track, the filename and ID3 tag if the recording is in an MP3 file, and the table of contents (TOG) data if the recording is on a CD. If the file containing the recording was produced by a client device operating according to the invention, a unique ID will be extracted from the ID3 file, but initially it will be assumed that information is not available.

In an exemplary embodiment, the extracted information is sent from client 110 to server 120 to determine a possible identification of the unknown recording using at least one piece of the information extracted from recording 100 and a database 130 of correspondingly generated fingerprints for reference recordings. If text or a unique ID were extracted, an attempt is made to find a match. If a match is found using the text or unique ID, at least one algorithmically determined fingerprint is compared with the fingerprint(s) stored in the matching records to determine whether there is a single reference recording that matches the information extracted from recording 100 with respective confidence levels for each item of information that matches. If no matches can be found based on text and unique ID, an attempt is made to identify the a single reference recording using at least two of the fingerprints extracted from recording 100. If a single reference recording is located using either method, preferably the duration of recording 100 is compared with the duration of the single reference recording as a final validation step.

Preferably related metadata is used for validation of the match obtained by fingerprint recognition. Like any recognition system fingerprinting can produce erroneous results. Without a validation component such an error can propagate throughout the system and return erroneous data to large percentages of users. The use of validation criteria such as track length comparison enables the system to catch potential errors and flag them for validation.

A system according to the present invention preferably includes custom result reporting and flexible administrative interfaces 130 to enable weighting of various identification methods and the order of their engagement. Analysis of successful match rates for specific identification methods allows an administrator to manipulate the identifying criteria for each component to maximize the identification probability. A system according to the present invention preferably incorporates usage data from over 28 million users utilizing the CDDB database via Gracenote Data Services division, to help guide results 140.

The flexibility of a system according to the present invention allows different configurations to be used for identifying recordings in different environments. An application that monitors streaming audio, for example, requires a very different system and solution architecture than one that identifies files in a peer-to-peer system, or one that identifies analog input. However the present invention can be configured for identification of recordings in each of these situations.

A system according to the present invention maximizes identification while minimizing resource usage. The use of multiple identification methods ensures that more resource intensive methods, such as audio fingerprinting are employed only when necessary. The use of multiple audio fingerprinting technologies reduces data collision and covers any "blind spots" in a given audio fingerprint technology. The "blind spots" found in single source fingerprinting systems, are avoided by using multiple sources for different fingerprinting techniques. This also provides the ability to fine tune deployment for specific target applications.

Figure 2:
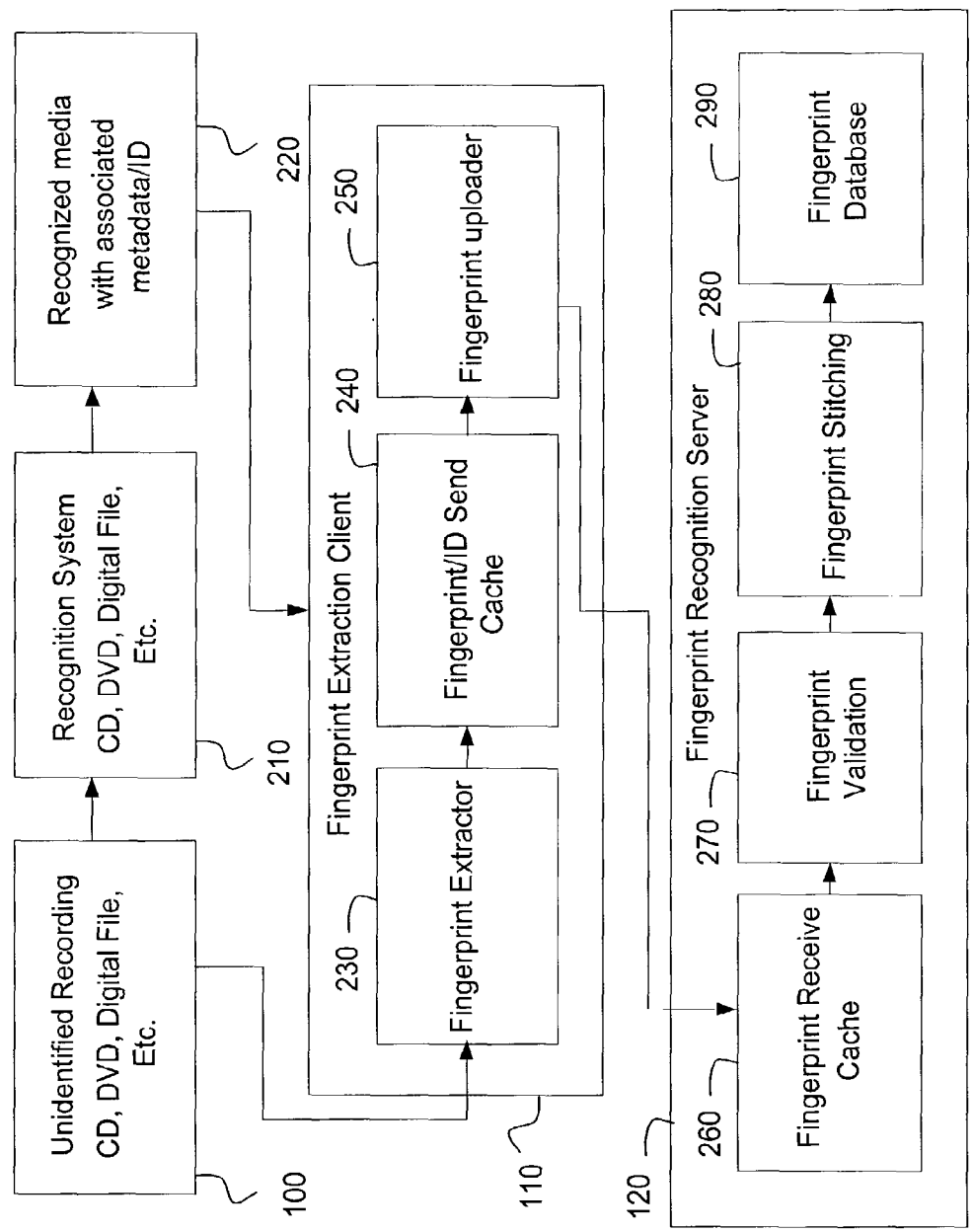
FIG. 2 is flowchart of a fingerprint extraction according to the present invention.

Preferably, fingerprints are obtained using multiple fingerprint recognition services using the method illustrated in FIG. 2. This increases the ability of the system to accurately recognize recordings of various types.

As illustrated in FIG. 2, when unidentified (unknown) recording 100 is accessed by fingerprint extraction client 110, if possible conventional TOC/file recognition is performed by recognition system 210 and results 220 are returned to fingerprint client 110. Results 220 include a unique identifier (TUID) that points into a master metadata database (not shown in FIG. 2), if the TUID is found. Recording 100 is also processed by fingerprint extractor 230 using at least one and preferably several different algorithmically derived fingerprint extraction systems to obtain fingerprint(s) which are stored in fingerprint/ID send cache 240. As described below in more detail, instructions are received regarding when fingerprint uploader 250 should send the fingerprints to fingerprint recognition server 120.

In fingerprint recognition server 120, the fingerprints transmitted by fingerprint uploader 250 are initially stored in fingerprint receive cache 260. The fingerprints then undergo fingerprint validation 270 using an algorithmic comparator that attempts to cross-correlate fingerprints for a recording with fingerprints uploaded and extracted by different end users. If it is found that the fingerprints are substantially similar, they would be validated. This is not the only method that's available for validation, but serves as one example of a process that could be used to reject bad data.

In this embodiment, fingerprints that are determined to be valid and related undergo stitching 280. For example, if fingerprints are taken from 30 second segments of the recording, the fingerprints are assembled into a continuous fingerprint stream. This could simplify recognition of segments of the recording. The resulting fingerprints are stored in fingerprint database 290 associated with existing database 90 (FIG. 1).

The CDDB database has in part been generated through user submissions to create a metadata database with over 12 million tracks and 900,000 albums as of mid-2002. This database contains both basic metadata (artist, album, and track names) as well as extended data (genre, label, etc.).

A similar distributed collection method may be utilized in the creation of a waveform database using the system illustrated in FIG. 1. In the case where recording 100 is a raw audio waveform, e.g., when a CD is encoded into another format, such as an MP3 file, client device 110 obtains non-waveform data associated with recording 100 which is possessed by a user of database 90 and executes extraction algorithm(s) to extract fingerprints from at least one portion of the recording. The fingerprints are then sent to server 120 with a unique ID, preferably derived from the TOC of the CD. When the unique ID is available, i.e., a match is found in the database for the non-waveform data, server 120 is able to associate the appropriate metadata in database 90 and the fingerprint(s) with same level of accuracy as identification of CDs by the existing database 90 which is provided for identification of recordings possessed by users. Fingerprints dynamically gathered in this manner may be sent to a fingerprint collection server (not shown in FIG. 1) which would accumulate fingerprints from authenticated clients, as described in more detail below, prior to storing the at least one fingerprint as identifying information for the recording.

Multiple fingerprint gathering extractors can also be run over a set of static waveforms from a commercial encoder such as Loudeye or Muse. The challenge with this approach is associating the fingerprints with the appropriate metadata. The method described above enables audio fingerprints to be logically associated with parent records and associated back to the original audio source. In the preferred embodiment, the unique ID provides differentiation between live and studio versions of the same song while simultaneously linking those records to the same artist and their respective albums.

Preferably server(s) 120 store information in a parallel record set that are linked with unique IDs. When client 110 asks server 120 to recognize media (CD, digital audio file, video file) server 120 may also return a record about how fingerprints should be gathered for this particular CD. This is called the Gathering Instructions Record (GIR). The GIR may include a set of instructions that the remote fingerprint gathering code follows. The record may be precomputed in off hours or may be dynamically computed at the time of recognition.

Server 120 may use information it knows about the popularity of a CD to drive decisions about gathering. Everything about a rare CD could be gathered, because the opportunity to get the fingerprints would not want to be missed (even if it was somewhat burdensome to the user). The opposite situation could be true for a very popular CD. The load may be distributed across many users so that they would not even notice that any work for fingerprint gathering was occurring.

The rules and procedures for building the GIR may be manual, automated and may change over time. They may also be applied uniquely to specific users, applications or geographic locations.

In one embodiment, the server dynamically gathers fingerprints by modifying the GIR to remove fingerprints that have been gathered previously. The frequency of updating GIRs may vary from instant to delays of days, weeks or months. Some example instructions that may be included in the GIR are:

A list of track and segments to be gathered and their priority.
A fingerprint generator algorithm to use.
Parameters that tell the fingerprint generator how to process the fingerprint, such as:
  Frequency of audio samples
  Bands of the frequency domain to process
  Resolution of the fingerprint
  Desired Quality of Audio
  When to do the fingerprint gathering, such as
  Before encoding the track
  After encoding the track
  In parallel with encoding the track
Instructions for caching the fingerprint and when to transmit it back to the server, such as
  Before encoding the track
  After encoding the track
  After the CD has been fully encoded
  When the communication channel back to the server is not busy
  When the next CD is looked up
  When a group of fingerprints is ready for transmission
Instructions to take CPU power into the process so as to not overload the computer Preferably, the system attempts to improve the quality of the fingerprints during operation. Quality of the source signal, the parameters used for fingerprinting, along with improvements in the fingerprinting algorithms will result in a complex quality matrix that is used by server 120 to determine what fingerprints to gather if higher quality is available. An example of source quality is provided below: Preferably, database 90 or a similar database maintained by fingerprint collection server(s) stores the source quality for fingerprints stored in the database, so that when a fingerprint from higher quality source is available, the fingerprint may be replaced.

Source Quality Table

| Name | Bit Rate | Compression | Error Correction | Quality Index |
| --- | --- | --- | --- | --- |
| CD_Audio_HEC | 44100 kbps | None | Hardware | 1 |
| CD_Audio_SEC | 44100 kbps | None | Software | 2 |
| CD_Audio | 44100 kbps | None | None | 3 |
| CDR_Audio | 44100 kbps | None | None | 4 |
| CDR_Made_From_MP3 | 44100 kbps | mp3 | None | 5 |
| MP3_File | 160 kbps | mp3 | None | 6 |

Fingerprints dynamically gathered may contain information that helps validate quality. Information such as errors while reading from the media may be sent up to the fingerprint collector. The system may reject fingerprints that had high error rates from the source media.

As noted above, instead of immediately storing a fingerprint, multiple fingerprints for a recording may be gathered in by a fingerprint collection server prior to being added to the database. These fingerprints may be compared algorithmically to determine their correlation. If correlation is not adequate then additional fingerprints may be gathered until adequate correlation is achieved and one of the fingerprints or a composite fingerprint is stored in the database. This prevents bad fingerprints from becoming part of the database.

Stitching of the segmented fingerprints may be necessary since slight variations in timing could result in overlap of the fingerprints. Algorithmic stitching could result in a higher quality continuous fingerprint. Simple stitching appends segmented fingerprints in order of appearance in the recording. Complex stitching could involve scaling different qualities of fingerprints to the lowest common denominator and then appending them in order of their appearance in the recording. Preferably some form of mathematical fitting is utilized if the fingerprint segmentation contains jitter, so that appending is a fuzzy process rather simple addition of the datastream.

One example of audio fingerprinting that can be used is described in the U.S. patent application entitled Automatic Identification of Sound Recordings, filed by Maxwell Wells et al. on Jul. 22, 2002 and incorporated herein by reference. However, any known algorithmically derived fingerprinting technique may be used, not only for digital audio, but also video, TV programs (both analog and digital) and DVDs. Appropriate identifiers and recognition techniques will be used for the media to be recognized in a particular application.

The present invention provides great flexibility and can be utilized for a wide variety of environments, including MP3 recognition in a peer-to-peer environment, or identification of an audio stream for monitoring and reporting purposes. No other solution is known to use multiple recognition components; so it is the only solution that can be customized to meet the needs of any audio (or video) recognition application.

A functional description for a deployment of the present invention in a peer-to-peer application will be described below with reference to FIG. 3. In this embodiment, audio files are identified before providing public access to them, to determine if the files are allowed in the system, a process known as "filter-in".

Client device 110 (FIG. 1) extracts information 310 (FIG. 3) from an audio file at the time of upload to server 120 (FIG. 1). The extracted information preferably includes non-waveform data, such as a unique ID, ID3 tag, filename text data, track duration, etc. and fingerprint(s) extracted from the recording and sent to server 120 for recognition.

The initial match 320 is performed against the unique ID, if present. Use of Gracenote's TUID enables a match to be returned with 99.9% accuracy. This is also the least resource intensive recognition method and can achieve very fast recognition rates. If the unique ID is present the system moves to the validation stage. If no unique ID is present the system attempts identification using the next recognition methods 330.

In this embodiment, text-based identification is tried next, using a metadata database, such as the Gracenote CDDB service which contains over 900,000 albums and over 12 million songs. Text matching utilizes available text, such as the filename, file path or text within the ID3 tag for MP3 files, to provide a set of data from which to attempt recognition. If an acceptable match is returned, the system moves to the validation stage. If a successful match is not returned, the system attempts identification utilizing the next recognition method.

The next step is fingerprint identification, in this case using audio fingerprints. The fingerprints from an unknown recording are compared to the fingerprints in database 90 for reference recordings, one fingerprint at a time (or in parallel using different processors for different fingerprints). Each fingerprinting technology returns a match and a level of confidence. If a single reference recording has acceptable confidence levels the system moves to the validation stage. If an unsuccessful match is returned the system can, depending on the target application, ask the user for validation of the most likely result or it can return a "no match found" result.

Validation is a key component to any successful recognition system. Preferably, key file attributes such as the duration of the recoding, are used to validate that a file is what the recognition system says it is by comparing an extracted length of the unknown recording with a stored length of the single reference recording.

Preferably heuristic and voting algorithms 340 are used to determine if a match is what the system says it is. This self-monitoring reduces the possibility that the system returns inaccurate data that pollutes the system. The heuristics may be manually controlled or algorithmically controlled to produce the best match. These heuristics may also be used to determine which recognition techniques to apply and in what sequence.

The administrator of each application can determine the level of accuracy needed by each stage (or component) of the system, and therefore has explicit control in optimizing the system. For example, if a 90% aggregate match is required the system administrator can use administrative interfaces 130 to adjust the levels of acceptable return to 90% and a successful result will not be generated unless that threshold is met. The administrator can also set result levels for each component. For example, a 99% text match can be required but only an 85% audio fingerprint match.

Once a successful identification is returned the file will be retagged 350 with the unique ID allowing for population of the file with the correct ID throughout the system. As a result, future identification of the file will require the least resource intensive recognition method.

The unique ID (TUID) assigned to the file is then matched 360 against a list 370 of TUIDs populated through the submission of Title/Artist pairs 370 by labels, publishers, and content owners of those files allowed in the system. In one embodiment, if the TUID is present in the database, the file is allowed to be shared, but if the TUID is not present in the database, the file is blocked. In another embodiment, if the TUID is present in the database, the file is blocked. Either of these embodiments could be applied to files recognized as they are accessed by a user, or transmitted from one computer to another.

Figure 4A:
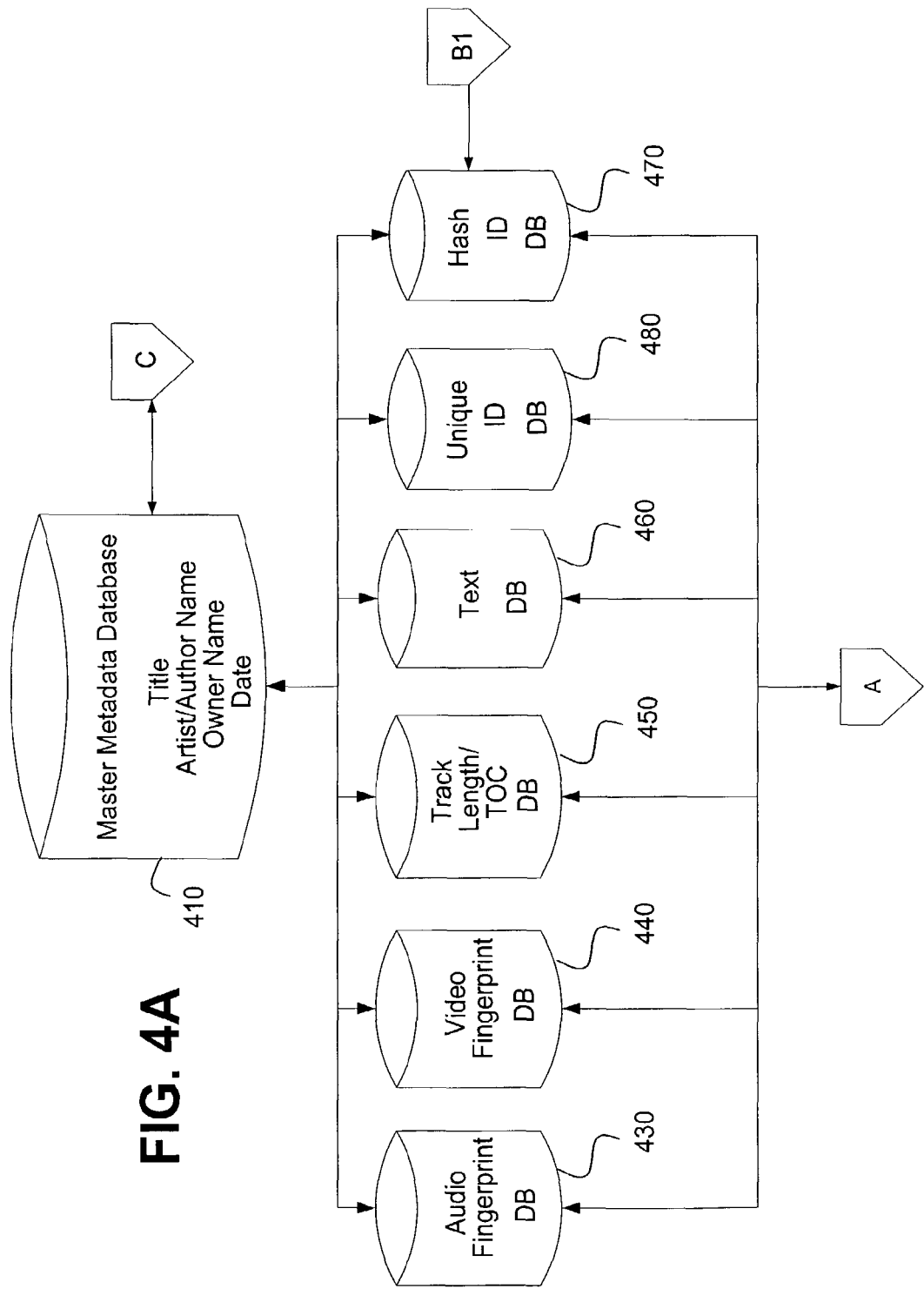
FIGS. 4A-4C are a block diagram of a system according to the present invention.

As illustrated in FIG. 4A, an embodiment of the present invention uses a plurality of related databases. Master metadata database 410 contains information on title, artist/author name, owner name and date. Related databases include audio fingerprint database 430 and video fingerprint database 440 which form fingerprint database 290 (FIG. 2). Also included are track length/TOC database 450, text database 460, and hash ID database 470 and guaranteed unique ID database 480.

As illustrated in FIG. 48, when unidentified (unknown) recording 100 is accessed by client device 110, information is extracted, including fingerprints 540, 550, metadata 560 and unique ID 570, if present. In addition, the duration 580 of the recording is determined and a numerical hash 590 is calculated. The extracted fingerprints are compared with fingerprints 600, 610. Similarly, matching 620, 630, 640 is performed on the numerical hash, text and unique ID. If a reference recording is located, validation is performed by comparing the duration of unidentified recording 100 with the duration of the reference recording. Results 660-710 with a level of confidence for each method of comparison is supplied to result aggregator 730.

Figure 4B:
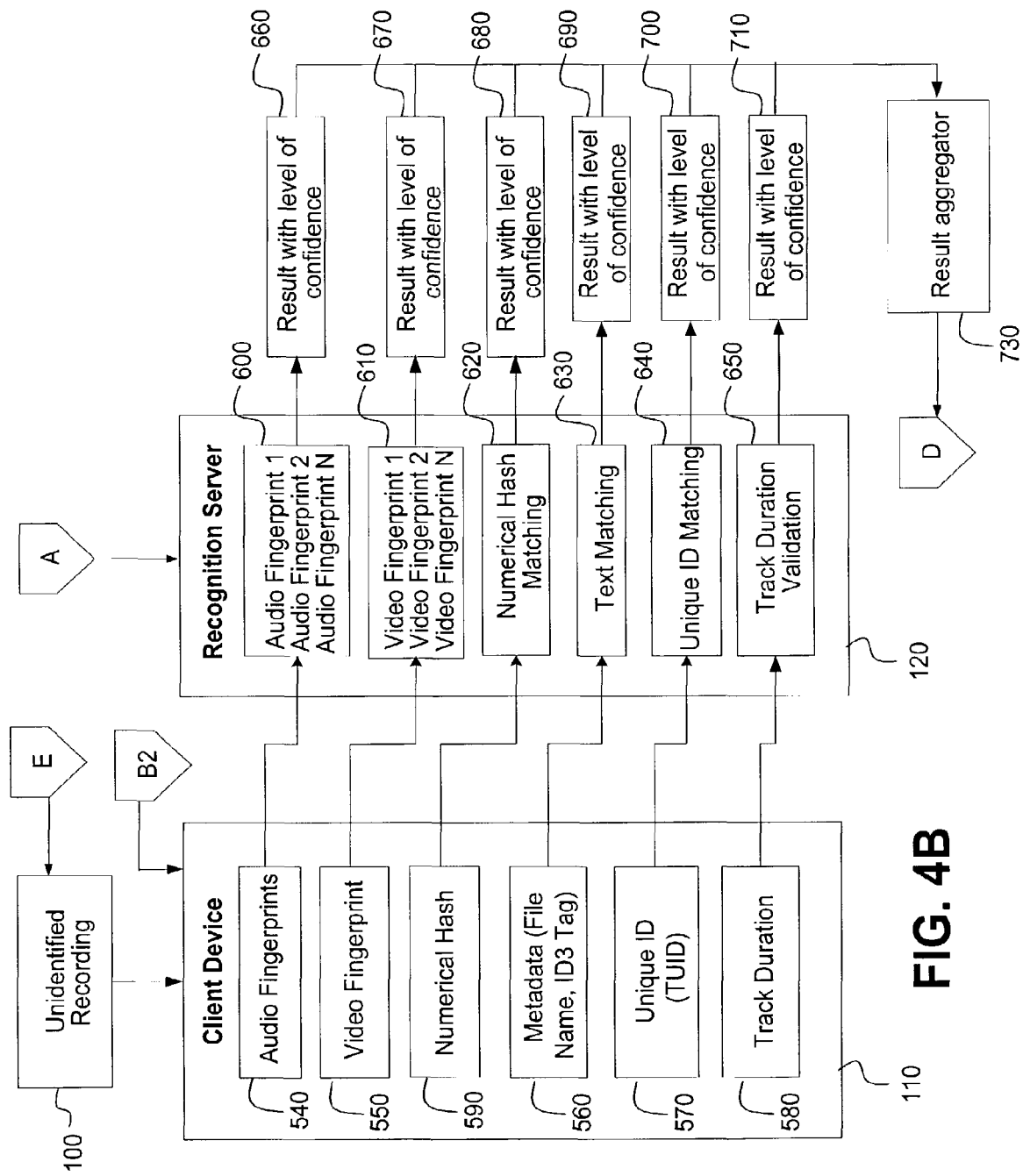
Figure 4C:
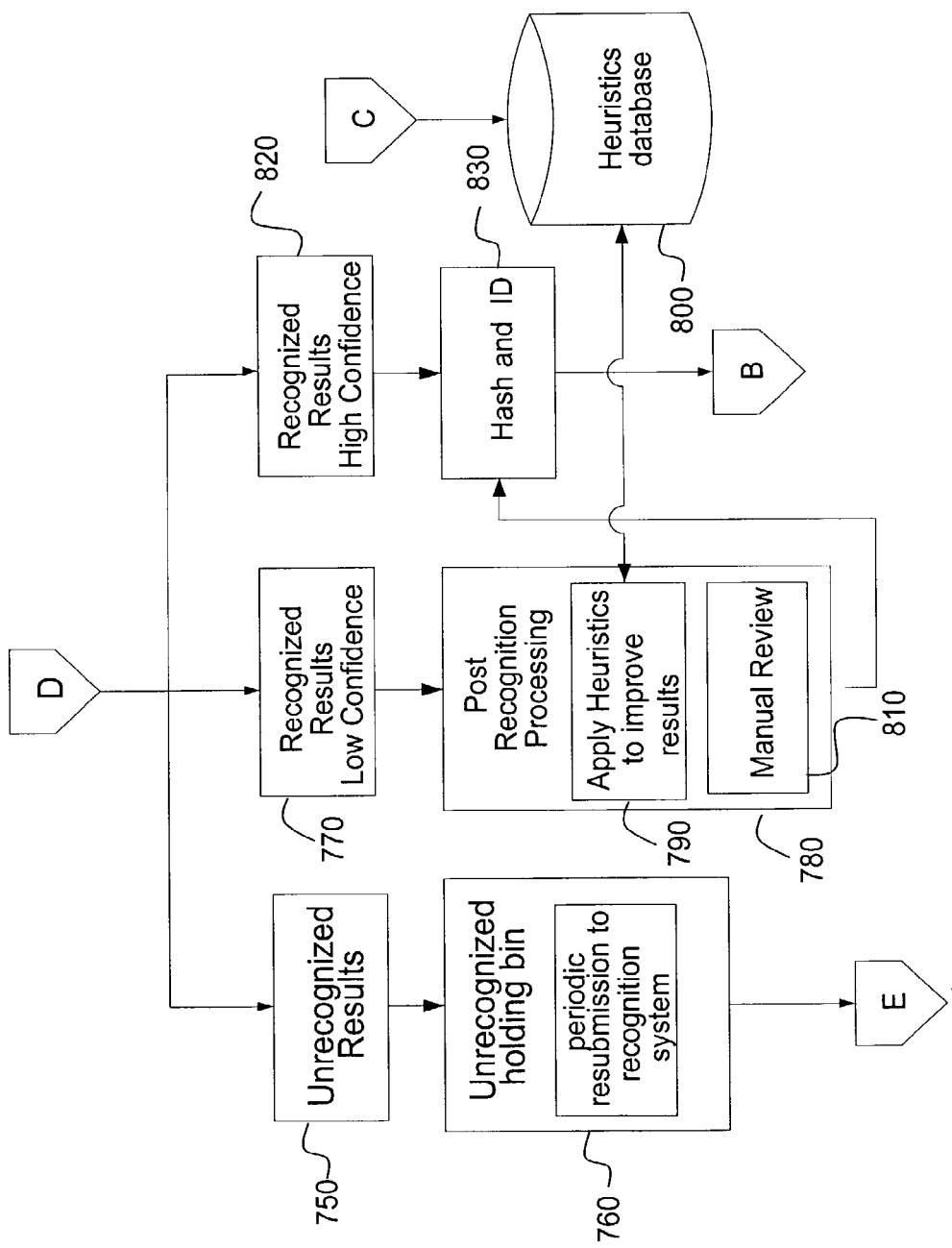

If no reference recording is found 750 matching unidentified recording 100, the extracted information 540-590 and results are stored in unrecognized holding bin 760 for periodic resubmission to recognition server 120 (FIGS. 2 & 4B). In this embodiment, if a reference recording is located 770 with a low aggregate confidence level, post recognition processing 780 is performed by applying heuristics 790, or a manual review 810, e.g., by presenting one or more possible matches to the user and receiving the user's selection in response. The results of such user selections may be included in the heuristics stored in heuristics database 820. If post recognition processing 780 results in identification of a single reference recording or result aggregator 730 outputs recognized results 770 with a high aggregate confidence level, the hash ID is generated 810 and sent to hash database 480 and client device 110, so that the hash and unique ID (TUID) can be stored in the ID3 tag, if a file is being created.

In one embodiment, the system learns by watching errors in repeated attempts at recognition of similar files to improve its results. It also may receive manual stimulus from users who indicate that there are errors in the results. This allows recognition to be continuously validated over time. For example a file could be recognized by a system according to the invention, then over time the system determines that recognition of that file was flawed, and indicates to an operator that there was something wrong. In another embodiment, the system determines what is wrong by monitoring non-fingerprint based data and changing the recognition results accordingly.

The present invention can be utilized to identify any audio content for tracking purposes. Digital audio streams, analog inputs or local audio files, can all be tracked. Such a tracking system could be a server side tracking system deployed at the point of audio delivery and integrated with a reporting, digital rights management (DRM) system, or rights payment system. If the audio content being tracked was from a non-participating third party a client version of the system may be deployed to monitor the content being distributed. In either case, multiple identification methods would be utilized to ensure the highest rate of accuracy.

Utilizing waveform recognition as a digital rights management component is possible, and can be deployed to compare user created digital audio files with lists of approved content. This enables a filter-in approach within a peer-to-peer file sharing architecture such as the one described above.

Audio fingerprinting technologies can be used as an anti-piracy tool, and can be customized to the type of audio being investigated. In the case of pirated CDs, the Gracenote's CDDB CD service may be utilized to provide table of content (TOC) recognition to augment audio fingerprinting technologies.

Identification is the enabling component to deliver value-added services. Without explicit knowledge of the content being distributed it is impossible to distribute value-added content and services that relates to that audio content.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example the system and method have been described as using a unique identifier. However, a hashed identifier could be used instead.

The invention claimed is:

1. A method, comprising:
accessing associated data that is associated with a recording, the associated data forming part of metadata associated with the recording;
extracting at least one fingerprint from at least one portion of the recording containing at least one of audio or video content data, the accessing and the extracting being performed for different copies of the recording;
storing the at least one fingerprint as identifying information for the recording when a match of the associated data is found in a database that contains the associated data, the associated data and the at least one fingerprint to be used in future identification of the recording;
comparing the at least one fingerprint extracted from a first one of the different copies with the at least one fingerprint extracted from a second one of the different copies; and
updating the at least one fingerprint in the database based on the comparing.

2. The method of claim 1, wherein the associated data indicates the length of the recording.

3. The method of claim 1, wherein the recording is stored on a removable medium and the associated data is derived from table of contents data for the recording.

4. The method of claim 1, wherein the associated data includes text associated with the recording.

5. The method of claim 4, wherein the text includes at least one of a file path and a filename of the recording, a title of the recording, an artist name of a participant in creation of the recording, or an album name associated with the recording.

6. The method of claim 1, wherein the associated data has been derived from an ID3 tag.

7. The method of claim 6,
wherein the ID3 tag includes encoded information, and
wherein the database is maintained by a provider of identification services and the encoded information is generated under control of the provider of identification services.

8. The method of claim 7, further comprising:
validating the associated data by decoding the encoded information prior to the storing of the identifying information in the database.

9. The method of claim 1, wherein the associated data includes a watermark.

10. The method of claim 1, wherein the associated data includes media information regarding source media type.

11. The method of claim 10, wherein the media information identifies the source media type as one of CD-R, CD-DA, a digital file, or a digital versatile disc.

12. The method of claim 1, wherein the accessing and the extracting are performed by client equipment, and wherein the at least one fingerprint is stored in the database in response to receiving the at least one fingerprint from the client equipment.

13. The method of claim 12, further comprising:
maintaining the database on at least one server under control of a provider of identification services, and
transmitting extraction instructions from the at least one server to the client equipment to guide the client equipment in the extracting.

14. The method of claim 13, further comprising:
transmitting the associated data from the client equipment to the at least one server; and
selecting the extraction instructions by the at least one server for transmitting the extraction instructions from the at least one server to the client equipment based on the associated data.

15. The method of claim 13, further comprising:
updating the extraction instructions based at least in part on at least one of frequency of receipt of the associated data for the recording or a number of users that have supplied the identifying information.

16. The method of claim 14, wherein the selecting of the extraction instructions is based at least in part on at least one of type of the client equipment receiving the extraction instructions, geographical location of the client equipment receiving the extraction instructions, software operating on the client equipment receiving the extraction instructions, or quality of copies of the recording.

17. The method of claim 13, further comprising:
transmitting the at least one fingerprint from the client equipment to the at least one server at a time specified by the extraction instructions.

18. The method of claim 13, further comprising:
storing the at least one fingerprint at the client equipment until a specified number of fingerprints are ready for transmitting to the at least one server.

19. The method of claim 17, wherein the transmitting the at least one fingerprint occurs when a communication channel coupled to the at least one server is available.

20. The method of claim 12,
wherein the recording is stored on a removable medium and the client equipment generates at least one encoded file from the recording.

21. The method of claim 1, wherein the database includes the identifying information for music recordings.

22. The method of claim 1, wherein the database includes the identifying information for video recordings.

23. The method of claim 1, further comprising:
detecting a quality of the at least one fingerprint;
identifying a copy of the recording using the at least one fingerprint; and
replacing the at least one fingerprint with a higher quality fingerprint when the copy of the recording produces the higher quality fingerprint.

24. The method of claim 23, wherein the detecting is based on at least one of an encoding technique used for the recording, a media type used to store the recording, error correction capability of user equipment accessing the recording, or a number of errors detected during the extracting.

25. The method of claim 1, wherein the updating is performed after the comparing determines that fingerprints extracted from the different copies have a predetermined correlation.

26. The method of claim 1, wherein the updating comprises:
combining fingerprints extracted from the different copies for storage in the database.

27. The method of claim 1, wherein at least two fingerprints are derived from the at least one of audio or video content data using different fingerprinting techniques.

28. The method of claim 1, wherein the associated data comprises table of contents data, and wherein the at least one fingerprint is extracted from one or more tracks of the recording.

29. A system, comprising:
a receiving unit to access associated data associated with a recording, the associated data forming part of metadata associated with the recording;
an extraction unit to extract at least one fingerprint from at least one of audio or video content data contained in at least one portion of the recording, the accessing and the extracting being performed for different copies of the recording; and
a storage unit, coupled to the receiving unit and the extraction unit, the storage unit to:
store the at least one fingerprint as identifying information for the recording when a match of the associated data is found in a database that contains the associated data, the associated data and the at least one fingerprint to be used in future identification of the recording;
compare the at least one fingerprint extracted from a first one of the different copies with the at least one fingerprint extracted from a second one of the different copies; and
update the at least one fingerprint in the database based on the comparing.

30. The system of claim 29, wherein the extraction unit is to extract at least two fingerprints from the at least one of audio or video content data using different fingerprinting techniques.

31. The system of claim 29, wherein the associated data includes at least one of a file path and a filename of the recording.

32. The system of claim 29, wherein the associated data comprises table of contents data, and wherein the at least one fingerprint is extracted from one or more tracks of the recording.

33. A method, comprising:
accessing associated data that is associated with a recording, the associated data forming part of metadata associated with the recording;
extracting at least one fingerprint from at least one portion of the recording containing at least one of audio or video content data;
storing the at least one fingerprint as identifying information for the recording when a match of the associated data is found in a database that contains the associated data, the associated data and the at least one fingerprint to be used in future identification of the recording;
detecting a quality of the at least one fingerprint;
identifying a copy of the recording using the at least one fingerprint; and
replacing the at least one fingerprint with a higher quality fingerprint when the copy of the recording produces the higher quality fingerprint.

34. A system, comprising:
a receiving unit to access associated data associated with a recording, the associated data forming part of metadata associated with the recording;
an extraction unit to extract at least one fingerprint from at least one of audio or video content data contained in at least one portion of the recording; and
a storage unit, coupled to the receiving unit and the extraction unit, the storage unit to:
store the at least one fingerprint as identifying information for the recording when a match of the associated data is found in a database that contains the associated data, the associated data and the at least one fingerprint to be used in future identification of the recording;
detect a quality of the at least one fingerprint;
identify a copy of the recording using the at least one fingerprint; and
replace the at least one fingerprint with a higher quality fingerprint when the copy of the recording produces the higher quality fingerprint.

* * * * *

UNITED STATES PATENT AND TRADEMARK OFFICE
CERTIFICATE OF CORRECTION

PATENT NO. : 8,468,357 B2
APPLICATION NO. : 12/720537
DATED : June 18, 2013
INVENTOR(S) : Roberts et al.

Figure 3:
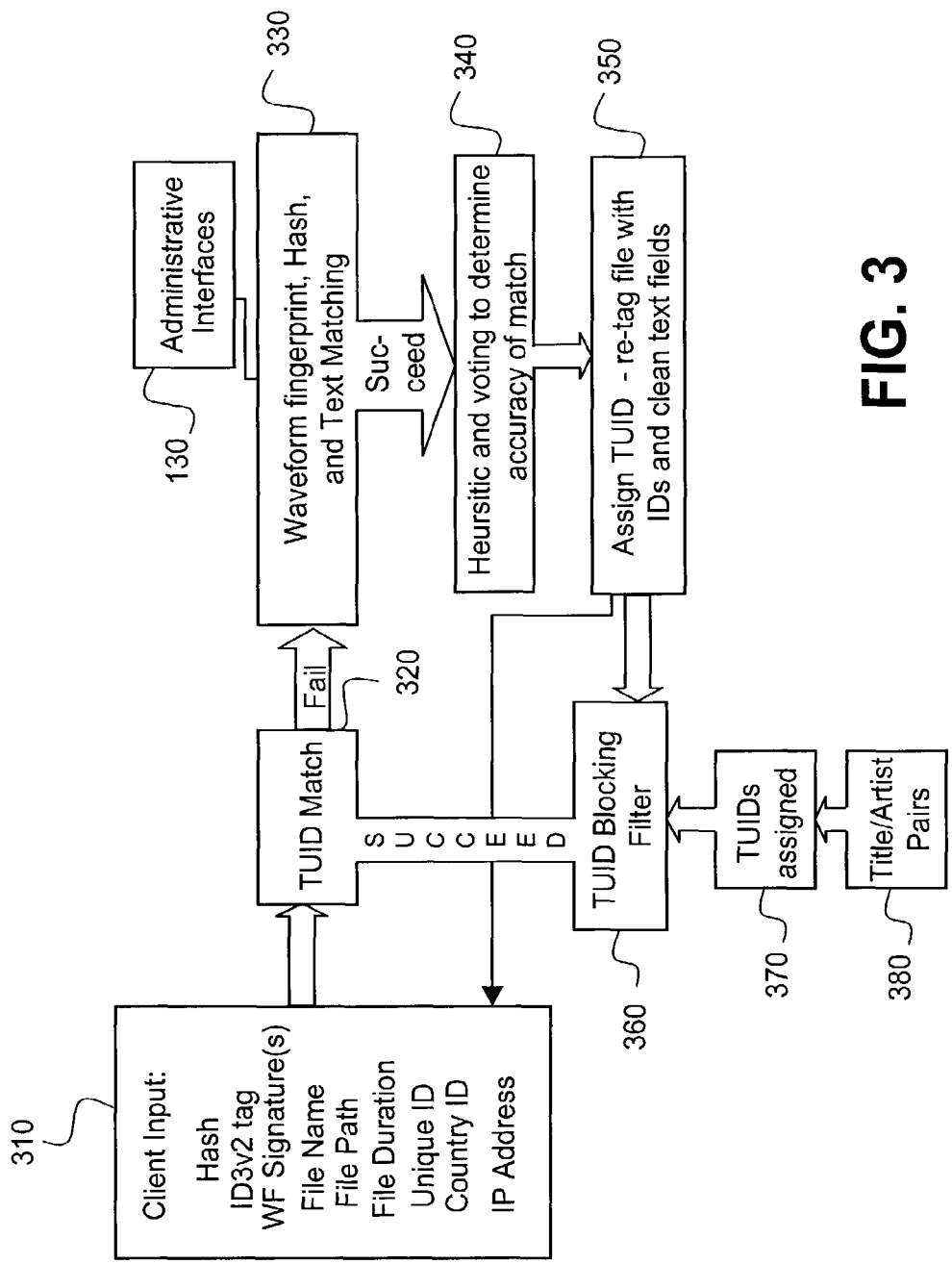
FIG. 3 is a flowchart of a method of recognizing unknown recordings.

It is certified that error appears in the above-identified patent and that said Letters Patent is hereby corrected as shown below:

On the title page, in column 2, under "Other Publications", line 1, delete "10/208,189 response" and insert --10/208,189, Response--, therefor On page 2, in column 1, under "Other Publications", line 10, delete "14." and insert --14 pgs.--, therefor On page 2, in column 2, under "Other Publications", line 3, delete "Japan" and insert --Japanese--, therefor On page 2, in column 2, under "Other Publications", line 3, delete "2003-517800" and insert --2003-517800,--, therefor On page 2, in column 2, under "Other Publications", line 5, after "Action", insert --mailed--, therefor On page 2, in column 2, under "Other Publications", line 13, delete "Mailed" and insert --mailed--, therefor On page 2, in column 2, under "Other Publications", line 14, delete "3." and insert --3 pgs.--, therefor On page 2, in column 2, under "Other Publications", line 18, delete "10/208,189" and insert --10/208,891,--, therefor On page 2, in column 2, under "Other Publications", line 35, delete "filed"," and insert --filed Jan. 26, 2011",--, therefor In the Drawings, Sheet 3 of 6, Fig. 3, reference numeral 340, delete "Heursitic" and insert --Heuristic--, therefor Signed and Sealed this
Seventeenth Day of February, 2015

Michelle K. Lee
*Deputy Director of the United States Patent and Trademark Office*

CERTIFICATE OF CORRECTION (continued)
U.S. Pat. No. 8,468,357 B2

In the Specification,

In column 5, line 10, after "identify", delete "the", therefor

In column 6, line 37, after "i.e.,", insert --when--, therefor

In column 9, line 13, delete "levels" and insert --level--, therefor

In column 9, line 65, delete "FIG. 48" and insert --FIG. 4B--, therefor

In column 10, line 21, delete "820" and insert --800--, therefor

In column 10, line 24, delete "770" and insert --820--, therefor

In column 10, line 25, delete "810" and insert --830--, therefor

In column 10, line 25, delete "480" and insert --470--, therefor

In the Claims,

In column 12, line 3, in Claim 13, delete "services," and insert --services;--, therefor